US 6,704,719 B1

(12) United States Patent
Ericson (10) Patent No.: US 6,704,719 B1
(45) Date of Patent: Mar. 9, 2004

(54) DECISION TREE DATA STRUCTURE FOR USE IN CASE-BASED REASONING

(75) Inventor: Barbara J. Ericson, Decatur, GA (US)

(73) Assignee: NCR Corporation, Dayton, OH (US)

( * ) Notice: Subject to any disclaimer, the term of this patent is extended or adjusted under 35 U.S.C. 154(b) by 345 days.

(21) Appl. No.: 09/671,222

(22) Filed: Sep. 27, 2000

(51) Int. Cl.[7] .......................... G06F 17/00; G06F 17/60
(52) U.S. Cl. .............................. 706/48; 706/53; 705/9
(58) Field of Search ...................... 706/48, 53; 705/9

(56) References Cited

U.S. PATENT DOCUMENTS

| | | | | |
|---|---|---|---|---|
| 5,418,888 A | * | 5/1995 | Alden .......................... | 706/48 |
| 5,717,835 A | * | 2/1998 | Hellerstein .................. | 706/46 |
| 5,937,188 A | * | 8/1999 | Freeman ..................... | 717/104 |
| 6,122,572 A | * | 9/2000 | Yavani ........................ | 701/23 |
| 6,278,464 B1 | * | 8/2001 | Kohavi et al. .............. | 345/440 |
| 6,430,532 B2 | * | 8/2002 | Holzapfel .................... | 704/258 |

OTHER PUBLICATIONS

Hiramatsu etal, " Case Based Function Tree Generator for Client–Server Systems Configuration Design", IEEE International Conference on Systems, Man, and Cybernatics, Oct. 1997.*

Yoshida etal," Utilizing Design Rationale for Lay out Design Support," IEEE International Conference on Systems, Man, and Cybernatics, Oct. 1999.*

Richardson etal,"Induced Decision Tree for Case–Based Reasoning", IEEE Australian New Zealand Conf. on Intelligent Information Systems, Nov. 1996.*

* cited by examiner

Primary Examiner—George B. Davis
(74) Attorney, Agent, or Firm—Wood, Herroin & Evans, LLP (57) ABSTRACT

An apparatus, computer-readable medium and method for use in association with case-based reasoning and the like utilize a novel decision tree data structure that incorporates a search criterion in association with each test answer to a test criterion defined within a decision node, for use in selecting cases from a search space that match the associated test answer to the test criterion. As such, rather than storing identifiers to the actual cases in a case library, or search space, within a decision tree data structure, search criteria are used to provide the mechanism by which those cases that represent most likely best matches can be dynamically selected.

32 Claims, 5 Drawing Sheets

DECISION TREE DATA STRUCTURE FOR USE IN CASE-BASED REASONING

FIELD OF THE INVENTION

The invention is generally related to computers and computer software. In particular, the invention is related to case-based reasoning and decision tree data structures for use therewith.

BACKGROUND OF THE INVENTION

Case-based reasoning is but one of a number of types of computer analysis approaches for drawing conclusions from input data. Case-based reasoning typically uses a decision tree to "prune" a library of past cases, also referred to herein as a "search space." A decision tree is created by inductive reasoning, which draws generalizations from past data and applies those generalizations to new data to draw specific conclusions about the new data. Inductive reasoning is the complement of deductive reasoning, where responses to input data are developed from known general principles.

Case-based reasoning typically relies upon nearest-neighbor matching to attempt to predict a result for an unknown case based upon the results of past cases stored in a search space or library. As an example, case-based reasoning may be used by a bank to predict the likelihood that a particular customer would default on a loan, and thus whether a loan should be approved. Cases within a search space might include information such as the anticipated monthly payment, the length of time that a customer was employed at a certain job, the customer's monthly income, etc. Also, for each case in the library, an indication of whether that customer eventually defaulted on his or her loan would also be provided for each case. Then, whenever a new customer was presented to the bank, information about that customer could be presented as an unknown case, with nearest-neighbor matching used to locate those cases in the library that most closely resembled the data associated with the new case. Then, based upon whether those nearest-neighbor cases resulted in defaults, a determination could be made as to whether a loan should be approved for the new customer.

One difficulty associated with nearest-neighbor matching in case-based reasoning is the fact that nearest-neighbor matching can be extremely computationally intensive, particularly when a large number of cases exist in a library and a large number of characteristics, or attributes, need to be analyzed for each case. For this reason, often a logical construct known as a decision tree is utilized to narrow the search space with which nearest-neighbor matching is performed during case-based analysis of an unknown case. A decision tree is typically stored in a decision tree data structure, and is essentially used to prune a search space into a smaller subset of cases most likely to be relevant to an unknown case.

A conventional decision tree typically includes a collection of decision nodes arranged into a tree data structure, thus defining a plurality of paths that each identify different subsets of the cases from a search space. At each decision node, a test question is provided that queries a particular attribute of an unknown case and selects one of a plurality of test answers based upon the result of the query. Associated with each test answer is either a reference to another "child" decision node, from which another relevant query is performed, or a "leaf" node, which identifies a subset of cases from the search space, and which represents the end, or termination point, for a particular path in the decision tree. As such, a unique path is defined in the decision tree for each unique combination of test answers to the test questions presented in the decision tree, such that a relevant subset of cases may be identified for each combination of test answers.

By "pruning" the search space in this manner with a decision tree, the most likely subset of cases in the search space are quickly identified, so nearest-neighbor matching can then be performed on a smaller number of cases. As a result, case-based analysis may be performed significantly more quickly and with generally comparable results to those generated without the use of a decision tree.

The accuracy of a case-based reasoning system that incorporates a decision tree, however, can be significantly impacted by the manner in which a decision tree partitions a search space. As a result, a significant amount of effort has been directed to the automated generation of decision trees and the arrangement of decision nodes and test queries therein to maximize the accuracy of a decision tree.

One problem associated with the use of decision trees, in particular, stems from the relatively dynamic nature of case-based reasoning analysis. In particular, a case-based reasoning system is only as good as the data provided to the system, and it is therefore desirable to update a case library relatively frequently to build a comprehensive and current library with which nearest-neighbor matching may be performed. However, given that conventional decision trees store specific identifiers to the cases that match each path in the decision tree, anytime a new case is added to a case library or search space, the decision tree used to access that library will typically need to be regenerated. Generating a decision tree is computationally expensive, however, and as such, whenever a case library is updated, case matching cannot proceed until the decision tree is modified in view of the cases in the updated case library. As a consequence, for frequently updated libraries, system availability may be adversely impacted by the need to frequently regenerate the decision trees associated with such libraries.

Therefore, a significant need exists in the art for a manner of increasing the availability of a case-based analysis system, and in particular, for a manner of reducing the need to update decision trees utilized in such systems.

SUMMARY OF THE INVENTION

The invention addresses these and other problems associated with the prior art by providing an apparatus, computer-readable medium and method for use in association with case-based reasoning and the like that utilize a novel decision tree data structure. The data structure incorporates a search criterion in association with each test answer to a test criterion defined within a decision node, for use in selecting cases from a search space that match the associated test answer to the test criterion. Rather than storing identifiers to the actual cases in a case library, or search space, within a decision tree data structure, search criteria are used to provide the mechanism by which those cases that represent the nearest-neighbors for each path of the decision tree data structure can by dynamically selected.

Among other benefits, associating search criteria with test answers within a decision tree data structure takes advantage of the fact that the partitioning of a search space on a relatively coarse level, as is done with a decision tree data structure, typically does not require complete synchronization and currency with respect to a search space. As such, the utilization of search criteria in lieu of actual case identifiers eliminates the need to regenerate a decision tree after each modification (e.g., the addition of a new case) to the search space. While it still may be desirable in some embodiments to regenerate a decision tree data structure from time to time, the need to do so is significantly reduced, thereby increasing the availability of a case-based reasoning system for analyzing unknown cases.

Consistent with one aspect of the invention, a method is provided for applying case-based reasoning on an unknown case. The method includes traversing a path among a plurality of paths defined in a decision tree data structure to identify a subset of cases from a search space suitable for performing nearest-neighbor matching on the unknown case. Each path includes a plurality of decision nodes, and each decision node includes a test criterion defining a plurality of test answers. Each test answer has associated therewith a search criterion that selects cases in the search space that match the associated test answer. In addition, traversing the path includes, at each decision node in the path, selecting a test answer among the plurality of test answers defined by the test criterion for such decision node based upon an attribute associated with the unknown case, and applying the search criterion associated with the selected test answer to the search space to select cases in the search space that match the selected test answer. The method also includes performing nearest-neighbor matching on the identified subset of cases.

Consistent with another aspect of the invention, a method is provided for accessing a search space that includes a plurality of cases. The method includes analyzing a test criterion resident in a decision tree data structure to select a test answer from a plurality of test answers associated with the test criterion, retrieving a search criterion associated with the selected test answer, and applying the retrieved search criterion to the search space to select cases from the search space that match the selected test answer.

Consistent with an additional aspect of the invention a method is provided for generating a decision tree data structure for use in accessing a plurality of cases in a search space. The method includes generating a plurality of decision nodes, each decision node including a test criterion that defines a plurality of test answers, and associating a search criterion with each test answer defined by each test criterion, wherein each search criterion is configured to select cases from the search space that match the associated test answer.

Consistent with a further aspect of the invention, a computer-readable medium is provided including a decision tree data structure for use in accessing a plurality of cases in a search space. The decision tree data structure includes a test criterion configured to test an attribute associated with the cases, the test criterion defining a plurality of test answers, and a plurality of search criteria, each associated with a test answer from the plurality of test answers, and each configured to select cases from the search space that match the associated test answer.

Consistent with an additional aspect of the invention, an apparatus is provided, including a memory and a decision tree data structure resident therein for use in accessing a plurality of cases in a search space. The decision tree data structure includes a test criterion configured to test an attribute associated with at least a portion of the plurality of cases, the test criterion defining a plurality of test answers, and a plurality of search criteria, each associated with a test answer from the plurality of test answers, and each configured to select cases from the search space that match the associated test answer.

Consistent with yet another aspect of the invention, an apparatus is provided, including a memory and a decision tree data structure resident therein for use in identifying a subset of cases from a search space suitable for performing nearest-neighbor matching on an unknown case. The decision tree data structure includes a plurality of decision nodes defining a plurality of paths in the decision tree data structure, each decision node including a test criterion defining a plurality of test answers, and each test answer having associated therewith a search criterion that selects cases in the search space that match the associated test answer.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

The embodiments discussed hereinafter generally operate by embedding within a decision tree data structure search criteria that permit database queries to be utilized in the dynamic generation of a subset of cases from a search space with which to perform case-based reasoning.

As is well known in the art, a decision tree typically is represented using a plurality of decision nodes, each incorporating a test criterion, and organized into a plurality of paths, or "branches", that are selectively traversed for an unknown case based upon the application of the attributes of the unknown case to the test criteria defined within the tree. In a conventional decision tree, the leaf nodes, representing the termination points of each possible path through the decision tree, includes identifiers (e.g., pointers or record ID's) of the actual cases that best meet the test criteria for a particular unknown case. It is then with these identified cases that nearest-neighbor matching is performed to attempt to predict an outcome for the unknown case based upon the outcomes of the cases in the subset of cases identified by the decision tree.

Consistent with the invention, rather than storing case identifiers within leaf nodes, each answer within a decision tree path is associated with a particular search criterion, e.g., a structured query language (SQL) or other form of database query that will retrieve the case identifiers that satisfy each test and answer combination. Thus, at each decision node, a set of case identifiers that meet the test criterion for that node are dynamically generated. Then, using set intersection, the cases that meet all of the criteria in a path may be dynamically selected.

As an added benefit, in some embodiments, dynamically generating a subset permits a only a portion of a path in a decision tree to be used, e.g., until a candidate case set is small enough to perform efficient nearest-neighbor matching. Put another way, a result set of matching cases may be dynamically "pared down" from the entire search space at each decision node in a path, until a moderate number of cases remain in the result set, whereby an effectively variable-length decision tree paths are defined. As an additional benefit, in many instances, a decision tree need not be modified each time a new case is added to the case library. Such an advantage can be realized based upon the fact that generalizations often do not need to be completely in synchronization with the most current data in a case library to be useful. Thus, in contrast to conventional decision tree data structures, reduced maintenance, and thus increased availability of a case library, is typically provided.

Figure 1:
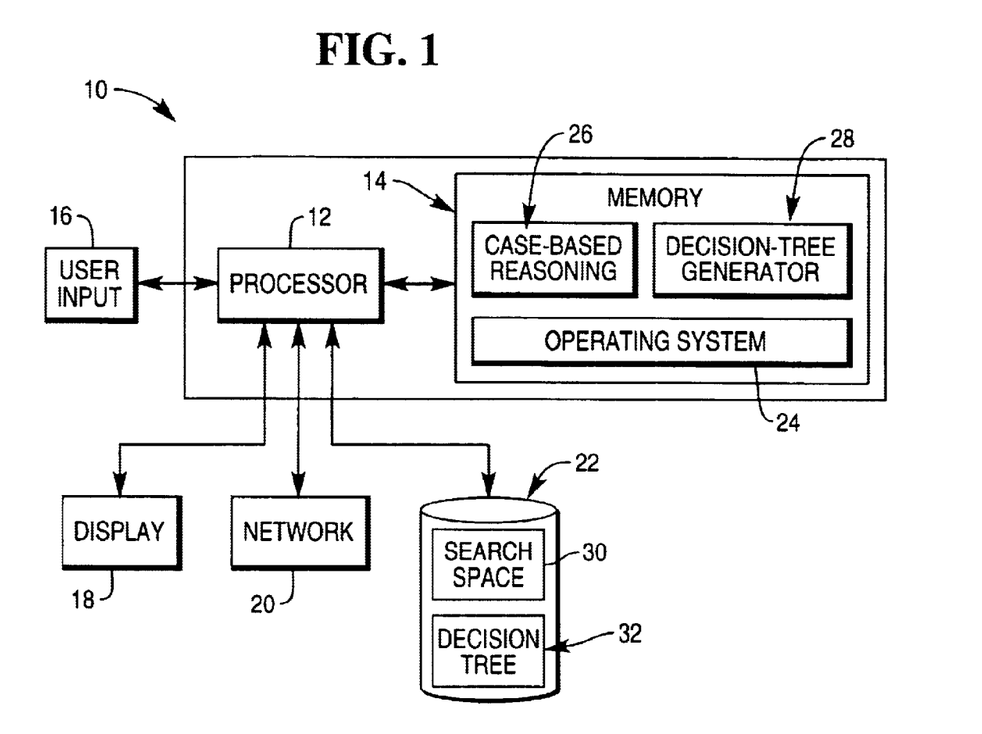
FIG. 1 is a block diagram of an apparatus implementing a case-based reasoning system consistent with the invention.

Turning now to the Drawings, wherein like numbers denote like parts throughout the several views, FIG. 1 illustrates an apparatus 10 implementing case-based reasoning consistent with the invention. For the purposes of the invention, apparatus 10 may represent practically any type of computer, computer system or other programmable electronic device, including a client or other single-user computer (e.g., a desktop computer, a laptop computer, a handheld computer, etc.), a server or other multi-user computer (e.g., an enterprise server, a midrange computer, a mainframe computer, etc.), an embedded controller, etc. Apparatus 10 may be coupled to other computers via a network, or may be a stand-alone device in the alternative. Apparatus 10 will hereinafter also be referred to as a "computer", although it should be appreciated the term "apparatus" may also include other suitable programmable electronic devices as well.

Computer 10 includes one or more central processing units (CPU's), or processors, 12 coupled to a memory 14. Memory 14 typically represents the random access memory (RAM) devices comprising the main storage of computer 10, as well as any supplemental levels of memory, e.g., cache memories, non-volatile or backup memories (e.g., programmable or flash memories), read-only memories, etc. In addition, memory 14 may be considered to include memory storage physically located elsewhere in computer 10, as well as any storage capacity used as a virtual memory, e.g., as stored on a mass storage device or on another computer coupled to computer 10 via a network.

Computer 10 also typically receives a number of inputs and outputs for communicating information externally. For interface with a user or operator, computer 10 typically includes one or more user input devices 16 (e.g., a keyboard, a mouse, a trackball, a joystick, a touchpad, and/or a microphone, among others) and a display 18 (e.g., a CRT monitor, an LCD display panel, and/or a speaker, among others). In the alternative, e.g., for a multi-user computer, computer 10 may includes a workstation or other user terminal interface through which user input and output is exchanged.

Computer 10 may also include an interface with one or more networks 20 (e.g., a LAN, a WAN, a wireless network, and/or the Internet, among others) to permit the communication of information with other computers coupled to the network. Furthermore, for additional storage, computer 10 may also include one or more mass storage devices 22, e.g., a floppy or other removable disk drive, a hard disk drive, a direct access storage device (DASD), an optical drive (e.g., a CD drive, a DVD drive, etc.), and/or a tape drive, among others. It will also be appreciated that computer 10 typically includes suitable analog and/or digital interfaces between processor 12 and each of components 14, 16, 18, 20 and 22 as is well known in the art.

Computer 10 operates under the control of an operating system 24, and executes or otherwise relies upon various computer software applications, components, programs, objects, modules, data structures, etc. (e.g., case-based reasoning engine 26 and decision tree generator 28 shown as resident in memory 14, and search space or case library 30 and decision tree data structure 32 shown resident in mass storage device 22). Moreover, various applications, components, programs, objects, modules, etc. may also execute on one or more processors in another computer coupled to computer 10 via a network, e.g., in a distributed or client-server computing environment, whereby the processing required to implement the functions of a computer program may be allocated to multiple computers over a network.

In general, the routines executed to implement the embodiments of the invention, whether implemented as part of an operating system or a specific application, component, program, object, module or sequence of instructions will be referred to herein as "computer programs", or simply "programs". The computer programs typically comprise one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of existing in a computer-readable medium, which may include recordable media such as volatile/non-volatile memory devices, floppy and other removable disks, hard disk drives, magnetic tape, optical disks, etc., and/or transmission media such as digital and analog communication links. Furthermore, embodiments of the invention may also exist in the form of a signal borne on a carrier wave, either within a computer or external therefrom along a communications path.

Those skilled in the art will recognize that the exemplary environment illustrated in FIG. 1 is not intended to limit the invention. Indeed, those skilled in the art will recognize that other alternative hardware and/or software environments may be used without departing from the scope of the invention.

In the illustrated embodiment, case-based reasoning consistent with the invention is implemented principally in a case-based reasoning engine program 26 and a decision tree generator program 28. Each of programs 26, 28 rely upon a case library or search space 30 within which is stored a plurality of cases. In this context, a case may incorporate any suitable data structure representing a set of attributes, features or characteristics that define a particular occurrence or instance to be used in the performance of inductive reasoning.

As an example, for a system that attempts to predict whether a loan would default, each case may represent a customer that has previously applied for a loan, as well as whether that loan was approved or not, and if so, whether that loan eventually went into default. Each case in such a system might incorporate various attributes about the customer such as income level, time at their current job, monthly payment, other debts, etc. As another example, for a system that attempts to diagnose strokes, each case might represent a patient, with attributes assigned based on how the patient presented to the physician, the results of additional testing,etc. Given the applicability of case-based reasoning in a wide variety of other environments, however, it will be appreciated that the cases in a case library may vary substantially in different embodiments.

Generator program 28 generates from the case library a decision tree data structure 32, and it is this data structure that is utilized by engine program 26 during the performance of case-based reasoning. As will become more apparent below, any number of data structures may be utilized to represent a decision tree consistent with the invention.

In the illustrated embodiment, search space 30 and decision tree data structure 32 are stored in a database, e.g., an ODBC-compliant database. Furthermore, programs 26 and 28 may be implemented in a language such as Java from Sun Microsystems. Implementation of these components in these particular environments would be well within the ability of one of ordinary skill in the art having the benefit of the instant disclosure. Further, a wide variety of alternate environments may be used in the alternative.

Figure 2:
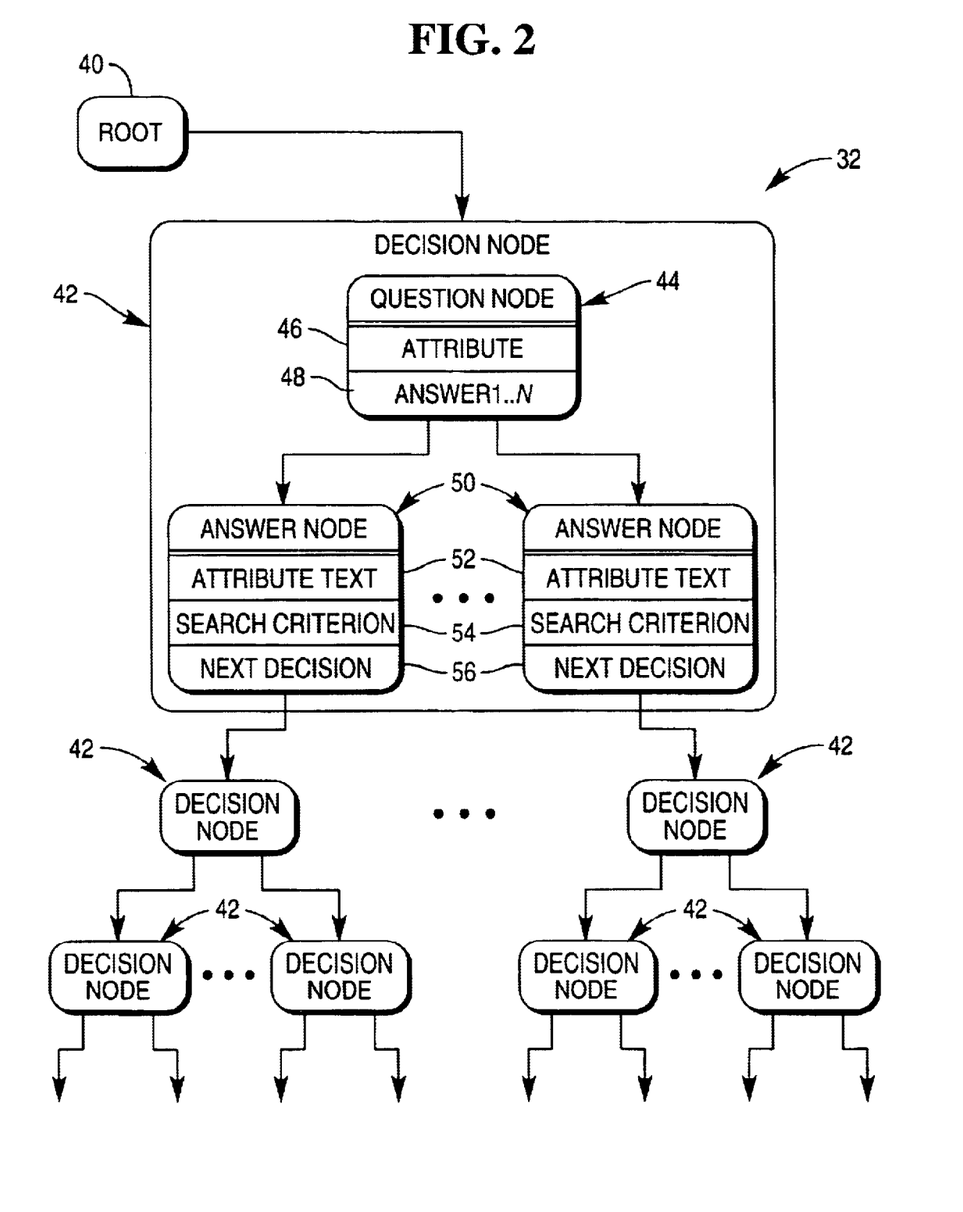
FIG. 2 is a block diagram of an exemplary decision tree data structure organization consistent with the invention.

FIG. 2 illustrates an exemplary decision tree data structure 32 in greater detail. A decision tree consistent with the invention typically incorporates a plurality of decision nodes 42, with each decision node 42 including a test criterion having a plurality of test answers, and a plurality of search criteria, with each search criterion associated with a test answer. Each search criterion selects those cases from the case library or search space that match the associated test answer.

In the illustrated embodiment, decision tree data structure 32 is specifically implemented to include a root pointer 40 that points to a root decision node for the decision tree, and from which a plurality of paths through the decision tree data structure extend. In the illustrated embodiment, each decision node 42 includes a question node 44 coupled to a plurality of answer nodes 50. Each question node 44 includes an attribute field 46 that identifies an attribute to be queried as a component for the test criterion defined for the decision node. In addition, an answer pointer field 48 includes a plurality of pointers, with each referencing an answer node 50 associated with each test answer to the test criterion for the decision node. As such, the set of answer nodes 50 within each decision node 42 define the set of possible answers to the test criterion defined for the decision node.

Within each answer node 50 is an attribute test field 52 that identifies a test condition for the attribute defined in field 46 of the associated question node 44, and from which a test answer to the test criterion for the decision node may be derived. For example, if the test criterion for a decision node is of the form "is the monthly payment less than $400?", the attribute identified in field 46 might be "monthly payment", while the attribute test fields 52 for the two possible answer nodes 50 might take the form of "monthly payment <$400" and "monthly payment >=$400". As such, in the illustrated implementation, each attribute test 52 essentially takes the form of a "true/false" boolean query, with the collection of attribute tests for a particular decision node configured so that only one attribute test will return a "true" result for any given set of attribute values for an unknown case.

It should be appreciated, however, that other implementations of a test criterion may be used in the alternative. For example, the test logic for implementing a test criterion may be implemented directly within a question node 44, with each pointer in answer pointer field 48 being indexed so that the test logic can select the appropriate pointer from field 48 responsive to input data to the decision node. Moreover, the decision node need not be partitioned into a question node and multiple answer nodes, as all of the logic for the decision node could be incorporated into a single data structure. In general, any number of alternate data structures may be utilized to implement the test and search criteria for each decision node consistent with the invention.

Each answer node 50 also includes a search criterion field 54 within which is stored a search criterion to be associated with the test answer represented by the answer node. Field 54 may store a search criterion having any number of formats appropriate for searching a search space for matching cases, e.g., a SQL or other form of database query. In addition, a next decision field 56 within each answer node provides a pointer to the next decision node in the path represented by the associated answer node. For a terminal point in the decision tree data structure, the next decision field 56 may store a "NULL" pointer.

As such, in response to the query of a test criterion at a particular decision node, one of a plurality of answer nodes 50 may be confirmed as a match for the test criterion, with the associated search criterion and the next decision node in the path associated with such test answer identified from the associated answer node 50. In addition, it will be appreciated that one of the answer nodes may represent a "default" answer node that is selected when none of the attribute tests for the other answer nodes match the unknown case. As such, it will be ensured that one of the available answer nodes will be selected in response to a query to a test criterion.

As mentioned above, each search criterion field 54 typically identifies search logic utilized to retrieve those cases from the search space that match the test criterion for the node. As such, by intersecting the sets generated at each decision node in a path, a subset of cases from a case library may be dynamically generated by traversing through a path in the decision tree. At the end of a particular path in the decision tree, the set intersection of all the search criterion represents the subset with which nearest-neighbor matching may be performed to complete case-based reasoning on an unknown case.

It will be appreciated that a decision tree data structure consistent with the invention may include any number of decision nodes, and with each decision node linked to any of a number of child decision nodes defining different paths through the decision tree data structure. A decision tree may also have any number of path lengths, as is well known in the art.

Moreover, it will be appreciated that a decision tree may be represented with a wide variety of data structures consistent with the invention. Therefore, the invention is not limited to the particular data structure implementation described herein.

Figure 3:
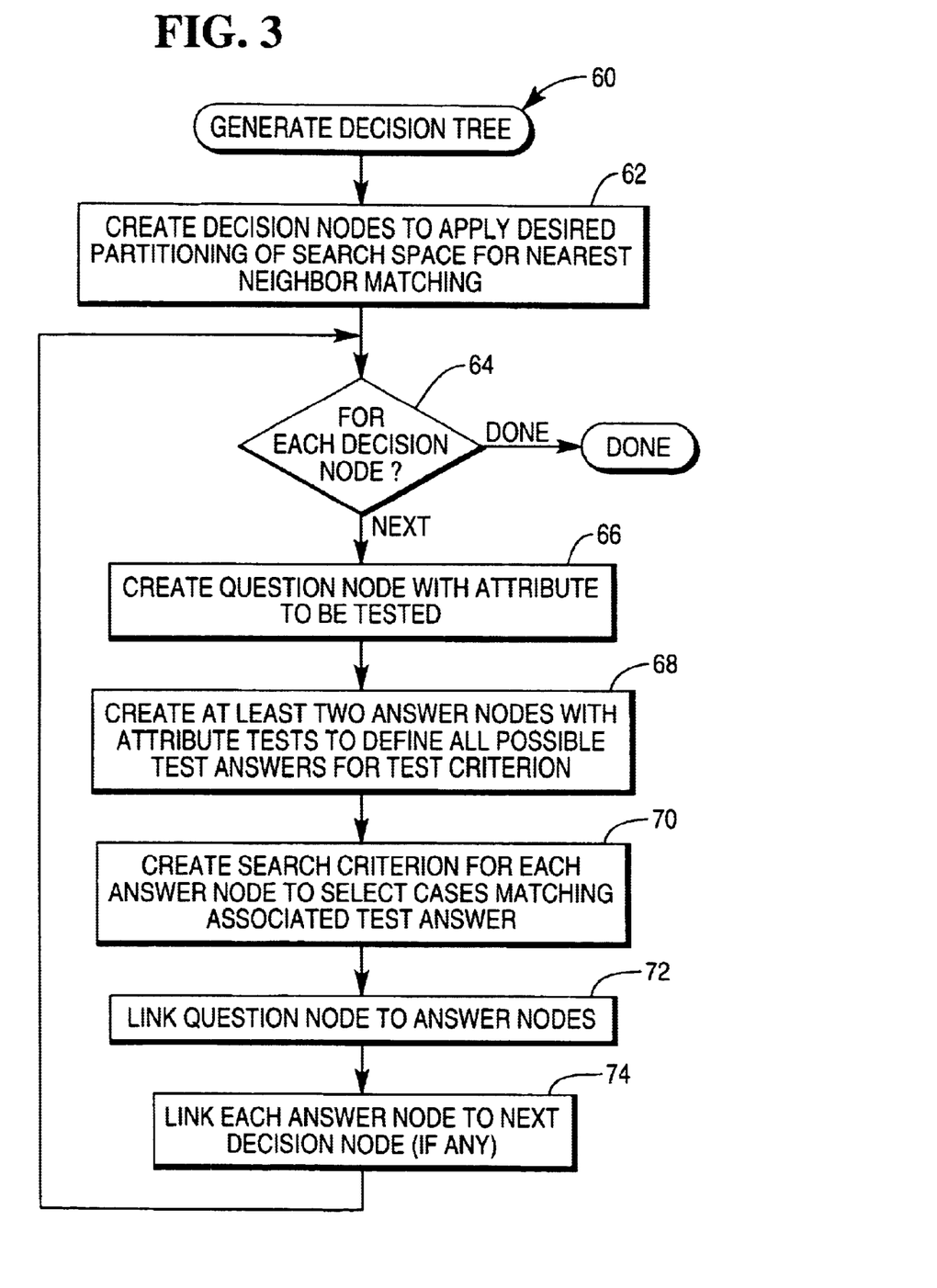
FIG. 3 illustrates the program flow of an exemplary generate decision tree routine executed by the decision tree generator of FIG. 1.

FIG. 3 illustrates a generate decision tree routine 60, executed by decision tree generator 28 of FIG. 1, and used to generate a decision tree data structure from the current case library. Routine 60 begins in block 62 by creating decision nodes for use in applying the desired partitioning of the search space for use in performing nearest-neighbor matching. Implementation of block 62 would be well within the ability of one of ordinary skill in the art having the benefit of the instant disclosure, and in particular, could utilize any number of a known decision tree generation algorithms to determine appropriate test criterion for use in partitioning the search space in a desirable manner.

Next, a FOR loop is initiated in block 64 to process each decision node created for the decision tree data structure. The FOR loop may process decision nodes linearly, or may proceed recursively through each path defined in the decision tree.

For each such decision node, control passes to block 66 to create a question node therefor including the attribute to be tested. Next, block 68 creates at least two answer nodes with the attribute tests necessary to define all possible test answers for the test criterion for the decision node. Next, block 70 creates a search criterion for each answer node to select the cases in the search space that match the associated test answer.

Next, block 72 links the question node to the answer nodes, by storing appropriate pointers in pointer field 48 of the question node (see FIG. 2). Next, block 74 links each answer node to the next decision node in the desired path for the decision tree, using a pointer stored in field 56 (see FIG. 2). Otherwise, if the currently-processed decision node represents a termination point in a path (i.e., the last decision node in the path), a "NULL" pointer may be stored in the next decision node field of the associated answer node. Upon completion of block 74, control returns to block 64 to process additional decision nodes in the tree.

Once each decision node has been processed in the manner discussed herein, routine 60 is complete, and the decision tree data structure is suitable for use by engine program 26.

Figure 4:
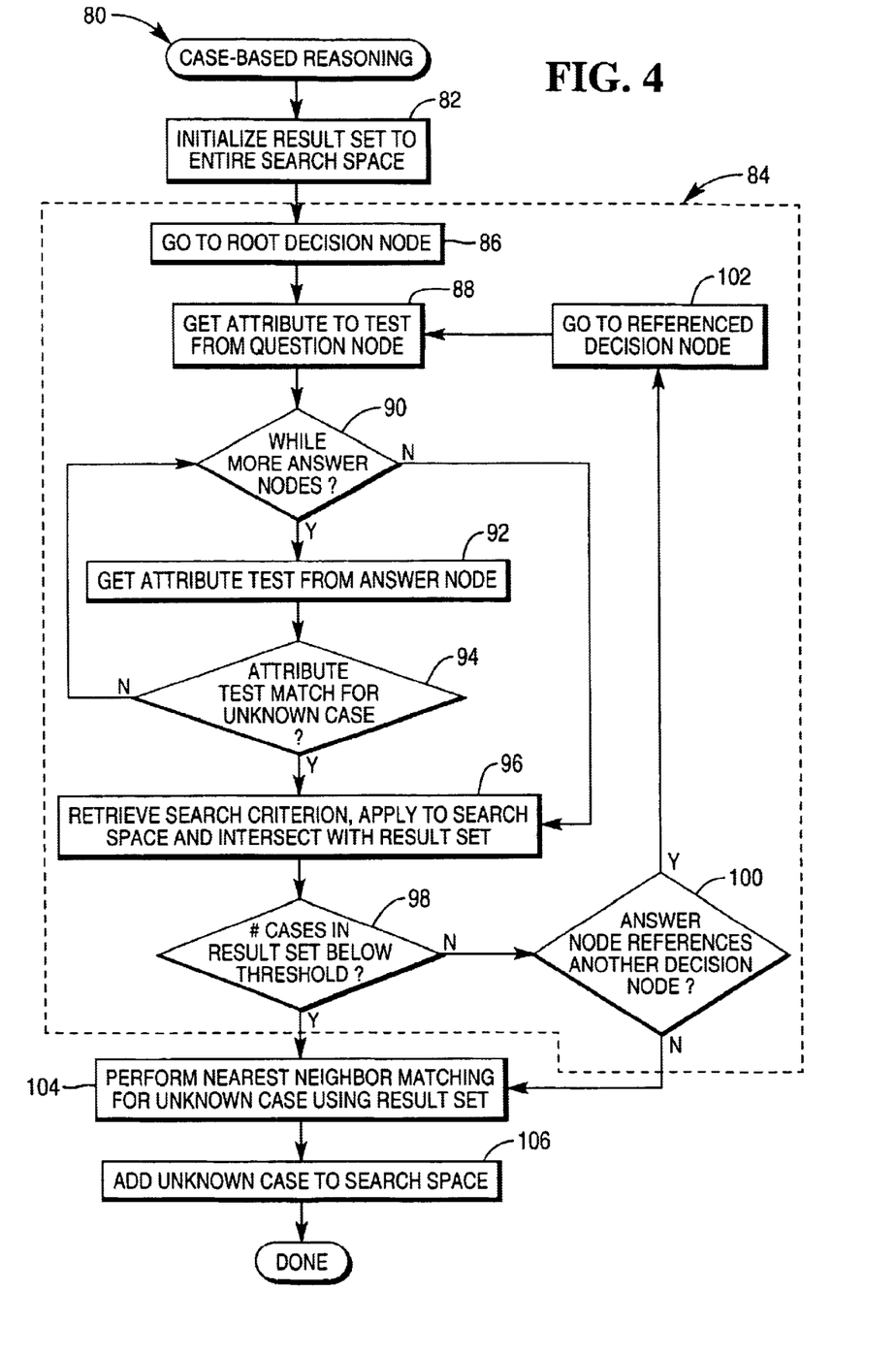
FIG. 4 illustrates the program flow of an exemplary case-based reasoning routine executed by the case-based reasoning engine of FIG. 1.

Utilization of a decision tree data structure is provided through case-based reasoning engine program 26, the principal operation of which is illustrated in FIG. 4 via case-based reasoning routine 80. Routine 80 begins in block 82 by initializing a result set to reflect the entire search space.

Next, a decision tree access routine, represented at 84, is performed to partition the search space into a desired subset based upon one or more attributes of an unknown case for which case-based reasoning is being performed.

In particular, block 86 starts at the root decision node for the decision tree data structure, e.g., by accessing the root pointer 40 for the decision tree data structure (FIG. 2). Next, block 88 retrieves the attribute to be tested from the question node for the root decision node. Next, block 90 performs a WHILE loop to sequence through the plurality of answer nodes in the decision node.

For each such answer node, control passes to block 92 to obtain the attribute test from the answer node. Block 94 then applies the attribute test and determines whether the attribute associated with the unknown case matches the applied test. If not, control returns to block 90 to process additional answer nodes.

Once an appropriate test match has been found, block 94 passes control to block 96 to narrow the result set based on the search criterion associated with the matching answer node. In addition, if no matching answer node is found, it is assumed that the last answer node in the sequence contains a default result, such that one of the answer nodes will always be selected in response to any test criterion. As such, block 90 will also pass control to block 96 if all answer nodes are processed without a match.

Block 96 retrieves the search criterion from the matching answer node, which is typically in the form of a database query such as an SQL query. Block 96 also applies the query to the search space and intersects the results of such query with the current result set, typically using an SQL intersect (IN) command, the use and configuration of which is well known in the art.

Next, block 98 determines if the number of cases in the result set is below a given threshold that is, whether the number of cases in the result set has fallen below a predetermined number of cases such that the search space has been narrowed a sufficient amount for performing efficient nearest-neighbor matching.

If not, control passes to block 100 to determine whether the selected answer node references another decision node in the decision tree data structure, indicating that the currently-processed decision node is not a termination point for a path in the decision tree.

Assuming first that the answer node does reference another decision node, control passes to block 102 to select the referenced decision node. Control then passes to block 88 to process the decision node in the same manner as the root node as discussed above.

Returning to blocks 98 and 100, if either the size of the result set falls below the desired threshold, or the end of a path in the decision tree has been reached, control passes to block 104 to perform nearest-neighbor matching for the unknown case using the result set generated in routine 84. Implementation of nearest-neighbor matching may incorporate any of a number of known algorithms, and as a result, such implementation would be well within the ability of one of ordinary skill in the art having the benefit of the instant disclosure.

Upon completion of block 104, case-based reasoning is complete on the unknown case, and the results may be presented to a user in an appropriate manner. However, as shown by block 106, it may also be desired to optionally add the unknown case to the search space sometime thereafter, representing additional feedback used to build and improve the case library. Typically, the addition of the unknown case to the case library is performed after additional data, representing the actual, versus the predicted, result, is obtained.

It will also be appreciated that, after addition of the unknown case to the search space, in many instances it is not necessary to regenerate the decision tree data structure. However, it may still be desirable to periodically refresh the decision tree such that the search criteria stored therein are kept relatively up-to-date with respect to the actual data within the case library, and thus keep the decision tree in an optimal configuration for the particular case library accessed by the decision tree.

As a further example of the generation and use of a decision tree data structure in the manner discussed herein, Table I below includes a representative case library including a number of cases in a case library for use in case-based reasoning in an exemplary loan approval application:

TABLE I

| Case # | Loan Status | Monthly Payment | Monthly Income | Time on Job |
|---|---|---|---|---|
| 1 | Good | $300 | $2000 | 2 years |
| 2 | Bad | $250 | $3000 | 6 months |
| 3 | Good | $450 | $5500 | 8 months |
| 4 | Bad | $500 | $4500 | 3 years |

Figure 5:
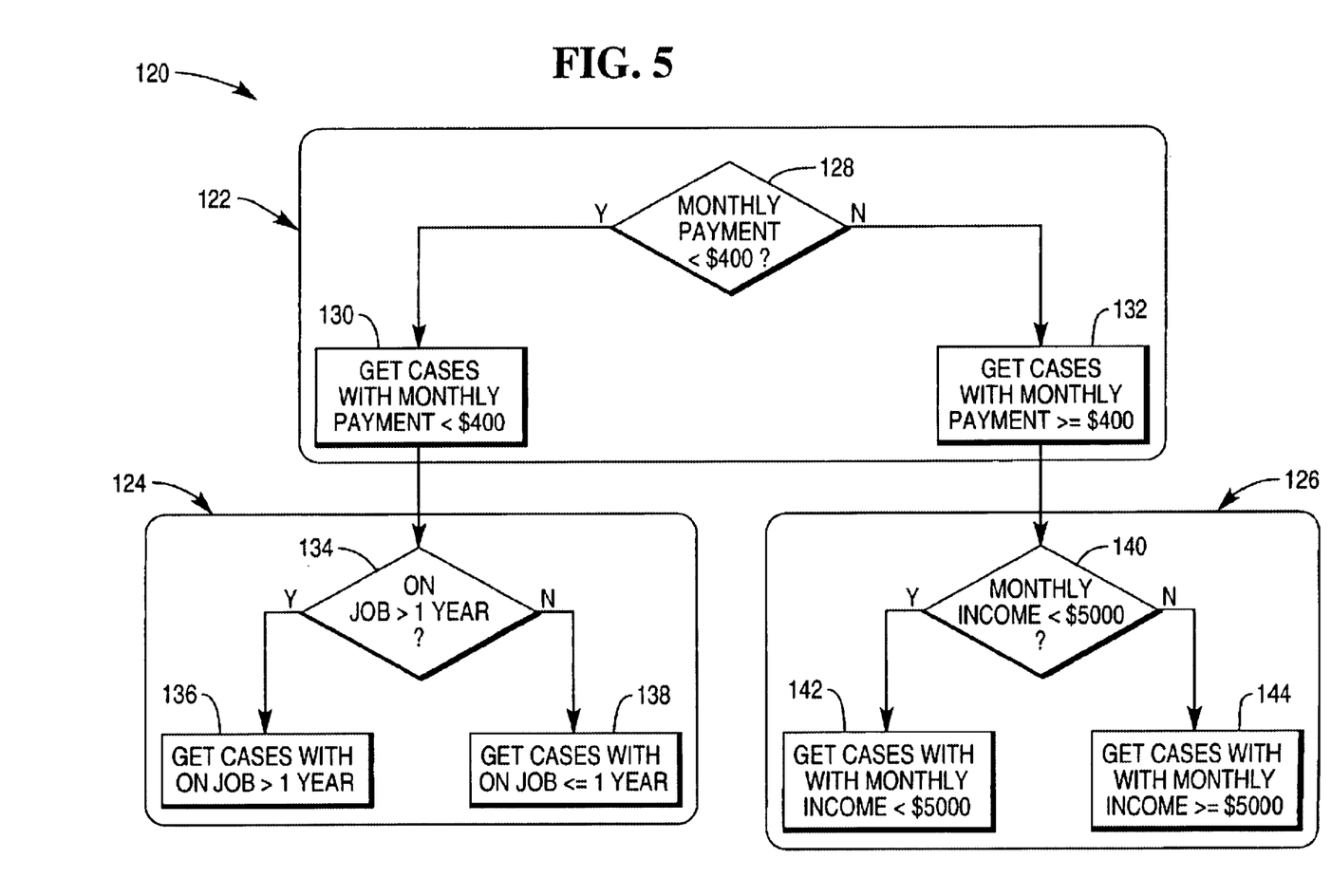
FIG. 5 is a block diagram of an exemplary decision tree data structure generated by the generate decision tree routine of FIG. 3.

FIG. 5 illustrates an exemplary representation of a decision tree data structure 120 generated by routine 60 (FIG. 3) based upon the case library of Table I. It will be assumed for the purposes of the example that the generation of decision nodes in block 62 of routine 60 determines that the search space can be reliably and efficiently partitioned based upon a first query as to the amount of the monthly payment, followed either by a query based upon the length of time the customer has been at the same job, or a query based upon the monthly income of the customer (the specifics of which are discussed in greater detail below).

Data structure 120 includes three decision nodes 122, 124 and 126, representing four possible paths through the data structure. Decision node 122, which is the root node for the structure, includes a test criterion 128 that partitions the search space based upon the value of the monthly payment being less than or greater than and equal to four hundred dollars. Two possible test answers to the test criterion are "yes" and "no", and for each possible test answer, an associated search criterion 130, 132 is provided.

For the "yes" test answer, a search criterion 130 that retrieves the identifiers to the cases having a monthly payment of less than four hundred dollars is used. Also associated with that test answer is decision node 124, which further partitions the search space based upon an additional test criterion 134.

Test criterion 134 next partitions the search space based upon whether the customer has held the same job for over one year. Two test answers to the test criterion, represented as "yes" and "no", are respectively associated with additional search criteria 136 and 138. Search criterion 136 retrieves the cases in the search space where the customer was in the same job for over one year, while search criterion 138 selects those cases from the search space where the customer was on the same job for less than or equal to one year.

Returning to decision node 122, in association with test answer "no", a search criterion 132 that retrieves the identifiers to the cases having a monthly payment of greater than or equal to four hundred dollars is used. Also associated with that test answer is decision node 126, which includes a test criterion 140 that determines whether the monthly income for a customer is less than five thousand dollars. Two test answers, represented as "yes" and "no", are respectively associated with search criteria 142 and 144, with search criterion 142 retrieving the cases where the monthly income is less than five thousand dollars, and search criterion 144 retrieving cases where the monthly income is greater than or equal to five thousand dollars.

Now assume an unknown case where the monthly payment is five hundred dollars, the monthly income is four thousand dollars and the time on the job is ten months. The application of the decision tree data structure to the unknown case using routine 80 of FIG. 4 would result first in a traversal down the "no" path in decision node 122 based upon test criterion 128, and thus resulting in an application of search criterion 132 to partition the search space into those cases having monthly payments greater than four hundred dollars. From Table I, therefore, the search space originally consisting of cases 1–4 would be partitioned into a subset that includes cases 3 and 4.

After partitioning via the search criterion, a traversal to decision node 126 would occur, with the application of test criterion 140 to determine whether the monthly income is less than five thousand dollars. Based upon the unknown case having a monthly income of four thousand dollars, the "yes" test answer would be traversed, resulting in the application of search criterion 142 to the search space. As a result, the intermediate result set of cases 3 and 4 would be intersected with those cases having a monthly income of less than five thousand dollars (cases 1, 2 and 4), resulting in a final search space consisting solely of case number 4. Furthermore, by virtue of the loan status for case number 4 being indicated as "bad", typically this would result in nearest-neighbor matching suggesting to reject the loan application.

It will be appreciated that in this simplified example, an extremely small case library is illustrated. However, in practical applications of the invention, the result of a decision tree application will typically result in the partitioning of a search space into tens, hundreds or even thousands of cases from a comparatively larger overall search space.

Various modifications may be made to the illustrated embodiments without departing from the spirit and scope of the invention. For example, rather than maintaining a running result set in routine 80, and dynamically narrowing the result set in response to each application of a new search criterion, it may be desirable to perform set intersections only upon the completion of the traversal of a path within a decision tree data structure. In particular, the search criterion applied at each decision node in a decision tree data structure may be applied to the entire search space, with the node-specific sets retrieved at each node intersected after the entire path in the decision tree data structure has been traversed. However, in many instances, it may be desirable to perform the dynamic reduction of the result set as shown by routine 80 such that the number of cases in the result set may be compared with a threshold so that the entire path defined within a decision tree data structure may not need to be traversed in all situations. Doing so may reduce the number of steps traversed, and thus reduce the amount of processing required in cased-based reasoning.

Other modifications will be apparent to one of ordinary skill in the art. Therefore, the invention lies in the claims hereinafter appended.

What is claimed is:

1. A computer-implemented method of applying case-based reasoning on an unknown case, the method comprising:
   (a) generating a decision tree data structure from a search space within which is stored a plurality of cases said search space being saved within a database;
   (b) traversing a path among a plurality of paths defined in said decision tree data structure to identify a subset of cases from said search space suitable for performing nearest-neighbor matching on the unknown case, wherein each path includes a plurality of decision nodes, each decision node including a test criterion defining a plurality of test answers, each test answer having associated therewith a search criterion that selects cases in the search space that match the associated test answer, wherein traversing the path includes, at each decision node in the path: .
      (i) selecting a test answer among the plurality of test answers defined by the test criterion for such decision node based upon an attribute associated with the unknown case; and
      (ii) applying the search criterion associated with the selected test answer to the search space to select cases in the search space that match the selected test answer to the test criterion; and
   (c) performing nearest-neighbor matching on the identified subset of cases.

2. The method of claim 1, wherein traversing the path further comprises, at each decision node in the path other than the last decision node, traversing to a next decision node in the path that is associated with the; selected answer to the test criterion.

3. The method of claim 2, wherein traversing the path further comprises generating the subset of cases from those cases in the search space that match the selected test answers for all of the decision nodes traversed in the path.

4. The method of claim 3, wherein applying the search criterion at each decision node comprises applying the search criterion to the entire search space to generate a node-specific subset of cases, and wherein generating the subset of cases includes performing a set intersection on the node-specific subsets of cases generated by all of the decision nodes traversed in the path.

5. The method of claim 3, wherein applying the search criterion at each decision node comprises, for each decision node after the first decision node in the path, applying the associated search criterion to a preceding subset of cases selected by a preceding decision node in the path to generate a current subset of cases for such decision node.

6. The method of claim 5, wherein traversing the path further comprises, at each decision node in the path determining whether the current subset of cases generated for such decision node has less than a predetermined number of cases, wherein performing nearest-neighbor matching occurs on a current subset of cases for a decision node in the path subsequent to a determination in such decision node that the current subset of cases generated for such decision node has less than the predetermined number of cases.

7. The method of claim 1, further comprising:
   (a) adding the first unknown case to the search space after performing nearest-neighbor matching; and
   (b) performing case-based reasoning on a second unknown case using the decision tree data structure after the first unknown case has been added to the search space and before the decision tree data structure has been modified subsequent to traversing the path in the decision tree data structure for the first unknown case.

8. A computer-implemented method of accessing a search space that includes a plurality of cases, said search space being saved within a database the method comprising:
   (a) analyzing a test criterion resident in a decision tree data structure to select a test answer from a plurality of test answers associated with the test criterion;
   (b) retrieving a search criterion associated with the selected test answer; and
   (c) applying the retrieved search criterion to the search space to select at least one case from the search space that matches the selected test answer to the test criterion.

9. The method of claim 8, further comprising, after applying the first retrieved search criterion to the search space:
   (a) analyzing a second test criterion resident in the decision tree data structure and associated with the first selected test answer to select a second test answer from a second plurality of test answers associated with the second test criterion;
   (b) retrieving a second search criterion associated with the second selected test answer; and
   (c) applying the second retrieved search criterion to the search space to select at least one case from the plurality of cases that matches the second selected test answer to the second test criterion.

10. The method of claim 9, wherein applying the first retrieved search criterion comprises applying the first retrieved search criterion to the entire search space to select a first subset of cases from the search space that match the first selected test answer, wherein applying the second retrieved search criterion comprises applying the second retrieved search criterion to the entire search space to generate a second subset of cases from the search space that match the second selected test answer, the method further comprising performing a set intersection on the first and second subsets of cases to generate a third subset of cases that match both of the first and second selected test answers.

11. The method of claim 9, wherein applying the first retrieved search criterion comprises applying the first retrieved search criterion to the search space to select a first subset of cases from the search space that match the first selected test answer, wherein applying the second retrieved search criterion comprises applying the second retrieved search criterion to the first subset of cases to generate a second subset of cases from the search space that match both of the first and second selected test answers.

12. The method of claim 9, further comprising, after applying the first and second retrieved search criteria to the search space:
   (a) identifying a subset of cases that match both of the first and second selected test answers; and
   (b) performing nearest-neighbor matching on the identified subset of cases.

13. A computer-implemented method of generating a decision tree data structure for use in accessing a plurality of cases in a search space, said search space being saved within a database the method comprising:
   (a) generating a plurality of decision nodes, each decision node including a test criterion that defines a plurality of test answers; and
   (b) associating a search criterion with each test answer defined by each test criterion, wherein each search criterion is configured to select at least one case from the search space that matches the associated test answer to the test criterion for which the associated test answer is defined.

14. The method of claim 13, further comprising storing each search criterion within the decision node from the plurality of decision nodes within which is resident the test criterion for which the associated test answer is defined.

15. A computer-readable medium comprising a decision tree data structure for use in accessing a plurality of cases in a search space, said search space being saved within a database, the decision tree data structure comprising:
   (a) a test criterion configured to test an attribute associated with at least a portion of the plurality of cases, the test criterion defining a plurality of test answers; and
   (b) a plurality of search criteria, each associated with a test answer from the plurality of test answers, and each configured to select at least one case from the search space that matches the associated test answer to the test criterion.

16. The computer-readable medium of claim 15, further comprising a decision node within which the test criterion and plurality of search criteria are logically arranged in the decision tree data structure.

17. The computer-readable medium of claim 16, wherein the decision node comprises:
   (a) a question node including an attribute to be tested by the test criterion; and
   (b) a plurality of answer nodes accessible via the question node and with which are logically arranged the plurality of search criteria, each answer node including an attribute test associated with a test answer defined by the test criterion.

18. The computer-readable medium of claim 17, further comprising a second decision node including a second test criterion defining a second plurality of test answers, and a second plurality of search criteria, each associated with a test answer from the plurality of test answers.

19. The computer-readable medium of claim 18, wherein a first answer node from the plurality of answer nodes includes a reference to the second decision node.

20. The computer-readable medium of claim 15, wherein the computer-readable medium includes at least one of a transmission medium and a recordable medium.

21. A computer system, comprising:
    (a) a memory;
    (b) a search space saved within a database;
    (c) a decision tree data structure resident in the memory, the decision tree data structure for use in accessing a plurality of cases in a said search space and including a test criterion configured to test an attribute associated with at least a portion of the plurality of cases, the test criterion defining a plurality of test answers, the decision tree data structure further including a plurality of search criteria, each associated with a test answer from the plurality of test answers, and each configured to select at least one case from the search space that matches the associated test answer to the test criterion.

22. The apparatus of claim 21, further comprising:
    (a) a processor coupled to the memory; and
    (b) a program configured to be executed by the processor to test an unknown case with the decision tree data structure by analyzing the test criterion based upon an attribute of the unknown case to select a test answer from the plurality of test answers, retrieving the search criterion associated with the selected test answer, and applying the retrieved search criterion to the search space to select at least one case from the search space that matches the selected test answer to the test criterion.

23. The apparatus of claim 22, wherein:
    (a) the decision tree data structure further comprises a second test criterion defining a second plurality of test answers, and a second plurality of search criteria, each associated with a test answer from the second plurality of test answers, and each configured to select at least one case from the search space that matches the associated test answer to the second test criterion; and
    (b) the program is further configured to analyze the second test criterion based upon an attribute of the unknown case to select a second test answer from the second plurality of test answers, retrieve the second search criterion associated with the second selected test answer, and apply the second retrieved search criterion to the search space to select at least one case from the search space that matches the second selected test answer to the second test criterion.

24. The apparatus of claim 23, wherein the program is configured to:
    (a) apply the first retrieved search criterion by applying the first retrieved search criterion to the entire search space to select a first subset of cases from the search space that match the first selected test answer;
    (b) apply the second retrieved search criterion by applying the second retrieved search criterion to the entire search space to generate a second subset of cases from the search space that match the second selected test answer; and
    (c) perform a set intersection on the first and second subsets of cases to generate a third subset of cases that match both of the first and second selected test answers.

25. The apparatus of claim 23, wherein the program is configured to apply the first retrieved search criterion by applying the first retrieved search criterion to the search space to select a first subset of cases from the search space that match the first selected test answer, and to apply the second retrieved search criterion by applying the second retrieved search criterion to the first subset of cases to generate a second subset of cases from the search space that match both of the first and second selected test answers.

26. The apparatus of claim 23, wherein the program is further configured to perform nearest-neighbor matching on the unknown case subsequent to applying the retrieved search criterion to the search space.

27. The apparatus of claim 21, further comprising a program configured to generate the decision tree data structure by generating a plurality of decision nodes, each decision node including a test criterion that defines a plurality of test answers, and associating a search criterion with each test answer defined by each test criterion such that each search criterion is configured to select at least one case from the search space that matches the associated test answer to the test criterion for which the associated test answer is defined.

28. A computer system, comprising:
    (a) a memory;
    (b) a search space saved within a database;
    (c) a decision tree data structure resident in the memory, the decision tree data structure for use in identifying a subset of cases from a said search space suitable for performing nearest-neighbor matching on an unknown case, the decision tree data structure including a plurality of decision nodes defining a plurality of paths in the decision tree data structure, each decision node including a test criterion defining a plurality of test answers, each test answer having associated therewith a search criterion that selects cases in the search space that match the associated test answer.

29. The apparatus of claim 28, further comprising:
    (a) a processor coupled to the memory; and
    (b) a program configured to be executed by the processor to traverse a path in the decision tree data structure by, at each decision node in the path, selecting a test answer among the plurality of test answers defined by the test criterion for such decision node based upon an attribute associated with the unknown case, and applying the search criterion associated with the selected test answer to the search space to select cases in the search space that match the selected test answer to the test criterion.

30. The apparatus of claim 29, wherein the program is further configured to perform nearest-neighbor matching on the identified subset of cases.

31. The apparatus of claim 30, wherein the program is further configured to add the first unknown case to the search space after performing nearest-neighbor matching, and perform case-based reasoning on a second unknown case using the decision tree data structure after the first unknown case has been added to the search space and before the decision tree data structure has been modified subsequent to traversing the path in the decision tree data structure for the first unknown case.

32. The apparatus of claim 29, wherein the program is further configured to traverse the path by, at each decision node in the path other than a last decision node, traversing to a next decision node in the path that is associated with the selected answer to the test criterion.

* * * * *